March 23, 1954

W. H. SILVER ET AL 2,673,093

CONDUIT SUPPORT FOR VEHICLE TRAINS WITH
CONDUIT-CONNECTED FLUID DEVICES

Filed Oct. 25, 1948

INVENTOR.
WALTER H. SILVER
OREY W. OERMAN
BY

ATTORNEYS

March 23, 1954
W. H. SILVER ET AL
2,673,093
CONDUIT SUPPORT FOR VEHICLE TRAINS WITH
CONDUIT-CONNECTED FLUID DEVICES
Filed Oct. 25, 1948
2 Sheets-Sheet 2
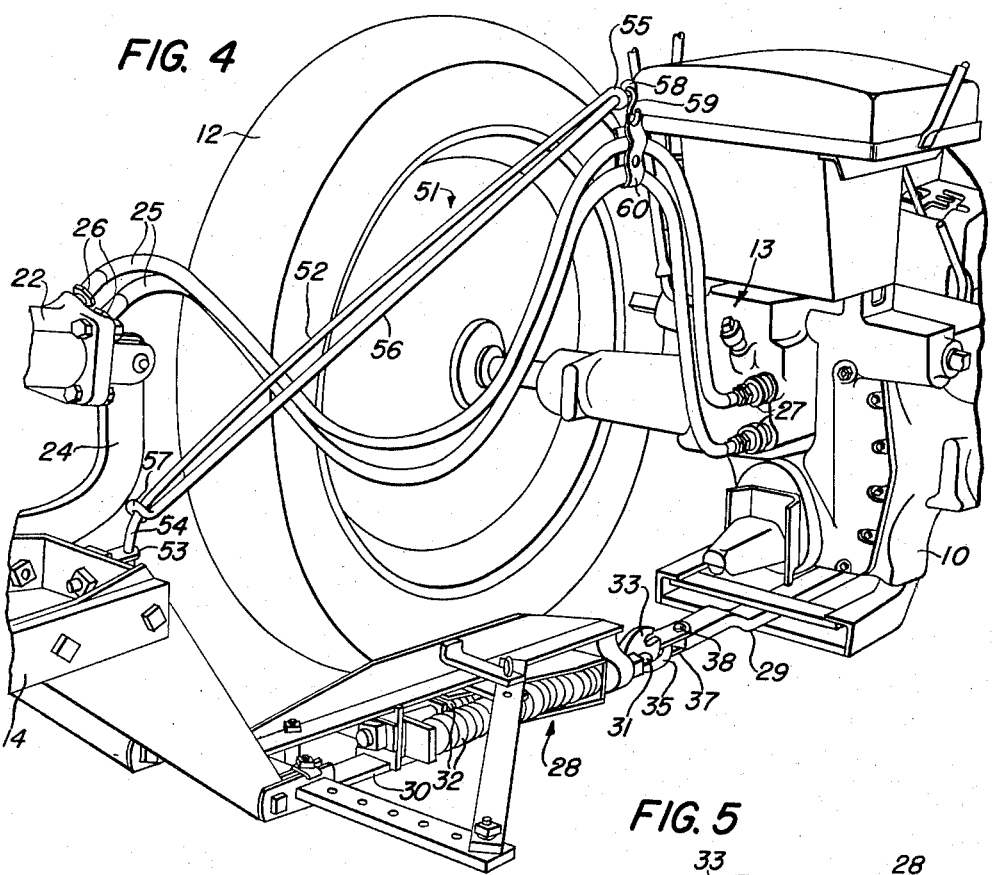
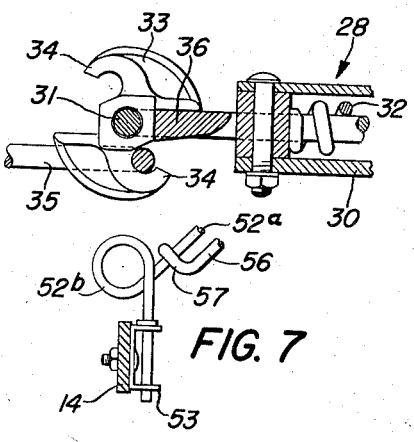
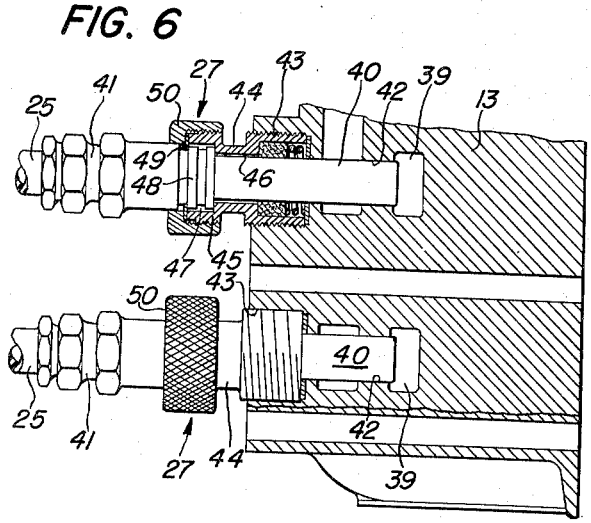
INVENTOR.
WALTER H. SILVER
OREY W. OERMAN
BY
ATTORNEYS Patented Mar. 23, 1954

2,673,093

UNITED STATES PATENT OFFICE 2,673,093

CONDUIT SUPPORT FOR VEHICLE TRAINS WITH CONDUIT-CONNECTED FLUID DEVICES

Walter H. Silver and Orey W. Oerman, Moline, Ill., assignors to Deere & Company, Moline, Ill., a corporation of Illinois Application October 25, 1948, Serial No. 56,286

6 Claims. (Cl. 280—421)

This invention relates to improvements for use in a vehicle train, such as a propelling vehicle having connected thereto a trailing vehicle or implement. More particularly, the invention relates to means for supporting a flexible conduit that interconnects fluid devices carried respectively on the propelling and trailing vehicles.

Although the principles of the invention may have wide application, the invention is designed primarily for use in an agricultural unit comprising a tractor to which an implement is connected by separable hitch means. The tractor will include a fluid device, such as a hydraulic pump, and a fluid device, such as a hydraulic motor, will be provided on the implement and connected to the pump by fluid-transmitting means including a flexible conduit. The fluid motor on the implement is used for adjusting the implement or a part thereof, as is well understood by those versed in the art.

Inasmuch as the hitch between the tractor and implement includes provision for relative articulation of the two, and further inasmuch as it is desirable in the usual case to employ the conduit and motor in connection with several implements that may be connected to the tractor, the conduit is ordinarily substantially longer than the normal distance measured on a straight line longitudinally between the pump and motor. It is customary in cases of this type to provide means for supporting the intermediate portion of the conduit in sinuous or looped form intermediate its ends, so that this portion of the conduit will be sustained in a position clear of the ground and clear of any possibility of its being damaged by relative movement of the tractor and implement.

In the case of a tractor-drawn plow, for example, the hitch is ordinarily separable or at least extensible so that in the event that the implement strikes an obstruction, the tractor may continue forwardly, at least to a limited extent, without damaging either the tractor or implement or the hitch. Even in cases wherein no provision has been made for deliberate separation or extension of the hitch, such separation may occur accidentally as the result of breakage of one of the parts. As an adjunct to this arrangement, it is customary to provide a releasable coupling in the fluid-transmitting conduit so that when the conduit is subjected to extreme tensional forces following release or extension of the hitch, the coupling may separate and prevent damage to the conduit or its related components.

According to the present invention, an improvement is provided for use in and in combination with units or vehicle trains of the type referred to above, an important object of the invention relating to the provision of means for supporting the slack or looped conduit in such manner that it is normally clear of the ground and free from any possibility of damage, this means being effective to allow the conduit to straighten under tensioning forces prior to separation of the coupling, after which the means is effective to sustain the conduit in such position that it will be clear of the ground, thus keeping exposed re-connectible portions of the conduit free from the accumulation of dirt.

Another important object of the invention is to provide the conduit-supporting means in the form of an extensible and deflectable means that accommodates changes in position of the conduit as the conduit is placed under tension. A further important object is the provision of means in the supporting structure providing for upward movement thereof so that it ultimately is in a position higher than previously in order that it may more effectively support the conduit in a position clear of the ground.

Further important objects of the invention are to provide: A relatively simple and inexpensive supporting means that may be readily incorporated in existing arrangements; a support including resilient or biasing means inherent therein for accommodating the function thereof; and, in general, improvement in the use and operation of tractors and implements or equivalent interconnected vehicles.

The foregoing and other important objects and desirable features inherent in and encompassed by the invention will become apparent to those versed in the art as preferred forms of the invention are fully disclosed in the following detailed description and accompanying sheets of drawings in which:

Figure 4 is an enlarged fragmentary perspective view showing the relationship between the tractor, an implement, and the supporting means for the fluid-transmitting means;

Figure 5 is a fragmentary sectional view, on an enlarged scale, showing a representative type of separable or releasable hitch;

Figure 6 is a fragmentary sectional view showing a representative form of coupling for connecting the fluid-transmitting means to the fluid device on the tractor or equivalent-propelling vehicle; and Figure 7 is a fragmentary detail view showing a modified form of support for the conduit-carrying means.

Figure 1:
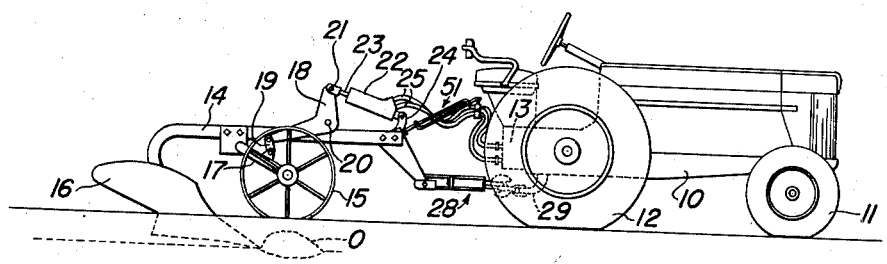
Figures 1, 2 and 3 are schematic illustrations representing first, a tractor and connected plow, second, disconnection of the hitch means between the two, and third, separation of the fluid-transmitting means incident to complete separation between the tractor and implement.

The tractor illustrated is of a type well known commercially and has a longitudinal body 10 carried on front and rear wheels 11 and 12, respectively. The tractor is of the type having power control or power lift means provided therein as an integral unit, such means being enclosed in a casing designated generally by the numeral 13. Several examples of a construction of this type are familiar to those versed in the art and, inasmuch as the particular type of fluid device forms no part of the present invention, no further illustration and description will be made beyond that necessary to explain, in general, the relationship of the device to the remainder of the organization illustrated.

The tractor 10 provides a propelling unit or vehicle which forms part of a vehicle train including a trailing unit, such as an implement or another vehicle. In the present case, an implement is illustrated as having a frame 14, a wheel 15 and an implement part, here shown as a plow bottom 16. The wheel 15 supports the frame 14 by means of a cranked axle 17, by means of which variations in depth of plowing may be accomplished. The operating means for such adjustment of the cranked axle 17 may take any form. That illustrated here as representative comprises a bell crank 18 having one arm connected by a link 19 to the axle 17.

The bell crank is rockably carried on the frame 14 on a transverse pivot 20 and the other arm is connected at 21 to a fluid device in the form of a hydraulic motor including a cylinder 22 and a piston 23. The cylinder 22 is supported on a bracket 24 rigid on a forward portion of the implement frame 14. Extension of the cylinder and piston between the points 21 and 24 rocks the bell crank 18 in a counterclockwise direction about its pivot 20 to exert a downward force on the wheel 15 for raising the frame 14 and plow bottom 16. Contraction of the cylinder-piston assembly provides for lowering of the implement frame and plow bottom. The cylinder-piston assembly may be of the two-way type in which both extension and contraction are accomplished by fluid under pressure; or, it may be of the one-way type in which extension is accomplished by fluid under pressure and contraction is accomplished by exhausting fluid from the cylinder under the influence of the weight of the implement. According to the present invention, it is immaterial which type of system is employed, that shown being of the two-way type.

The fluid or hydraulic system, including the fluid device on the tractor and the fluid motor on the implement, further includes fluid-transmitting means interconnecting the devices, this means here being shown as comprising a pair of flexible conduits such as conventional reenforced rubber hoses 25. Each of the conduits is provided at one end with a screw-threaded fitting 26 for connection to the cylinder 22. The other end of each conduit includes a coupling— designated generally by the numeral 27—for connecting the conduit to the housing 13 of the tractor fluid device. Each coupling will be described in detail below.

The implement is connected to the tractor in trailing relationship by a hitch designated generally by the numeral 28. The tractor includes a drawbar 29 which may be considered part of the hitch. The hitch illustrated does not, by itself, form any part of the invention except in so far as it is an element in combination with the other structure relating to the invention. Therefore, it will not be described in detail. The particular type of hitch illustrated is shown in the U. S. patent to Strandlund 2,271,748. Other hitches may be readily substituted for that illustrated.

The hitch 28 is of the separable or releasable type and includes a primary draft element 30 permanently connected to the plow frame 14. A secondary draft member or element 31 is carried by the element 30 by means providing for longitudinal relative movement of the two, which movement or extension is controlled by resilient means in the form of springs 32. The element 31 carries at its forward end a rotatable member 33 having a pair of hooked portions 34, one or the other of which may effect a draft connection with a clevis 35 connected to the tractor drawbar 29. A stop lug 36 on the element 30 normally prevents rotation of the member 33 and the draft connection is thereby effected so that the vehicle and implement travel together under normal conditions. In the event of the occurrence of an abnormal condition, as when the trailing implement encounters an obstruction, such as indicated at O in Figures 1–3, the tractor may continue ahead without damaging the implement or the hitch, because continued forward movement of the tractor will cause loading of the springs 32 as the member 31 is pulled forwardly relative to the stop lug 36. In the event that the obstacle is such that it cannot be overcome by drawbar pull of the tractor (as modified by the hitch 28), the member 33 will be freed from the lug 36, whereupon continued application of forward pull on the clevis 35 will rotate the member 33 so that the clevis 35 may disconnect from the hooked portion 34.

The connection of the clevis 35 to the drawbar 29 is effected by a U-shaped member 37 and pin 38. The connection between the clevis 35 and member 37 is such as to provide for relative articulation between the tractor and implement as the two encounter varying ground contour. The pin 38 provides a pivot on a vertical axis and enables the tractor and implement to have relative articulation transversely of the line of draft.

The fluid device on the tractor, which includes the casing 13, may also include a conventional fluid pump, not shown here since it may be of any type and its relationship to the remainder of the structure is obvious. As shown in Figure 6, the casing 13 is provided with a pair of fluid-transmitting passages 39 respectively in communication with the conduits 25 by means of nipples 40. The nipples 40 form part of the couplings 27, referred to above. Figure 6 illustrates one of the couplings in section. Since both couplings are identical, only one will be described.

The coupling 27 includes, in addition to the nipple 40, a passage 42 in the casing 13 through which the nipple extends to communicate the conduit 25 with the passage 39. The bore 42 includes an internally threaded counterbore 43 which receives a fitting 44. This fitting has an externally threaded portion 45 and a bore 46 coaxial with the bore 42 and surrounding the nipple 40. The fitting 44 includes within the externally threaded portion 45 a counterbore 47 which receives an annular rib or flange 48 preferably formed integral with the nipple 40. A frangible shear washer 49, of the segmental type, is positioned behind the annular rib 48 and is secured in place by an internally threaded collar 50 carried on the externally threaded portion 45 of the fitting 44. The coupling 27 thus connects the conduit to the casing 13 under normal operating conditions, but the washer 49 may shear in response to the application of extreme tensional forces to the conduits. Ordinarily, conditions resulting in the application of tensional forces to one conduit will have a similar effect on the other conduit and it is expected that both shear washers 49 will shear simultaneously. In this respect, the conduits 25 may be considered a single fluid-transmitting element.

Fluid-pressure systems of the type illustrated herein are customarily provided in such manner that the cylinder-piston assembly 22—33 and conduits 25 may be used with various types of implements. For that reason, the conduits 25 are ordinarily of substantial length. Further, this increased length is required in instances where there is considerable articulation between the interconnected vehicles. In any event, the conduits 25 are substantially longer than the distance measured along a straight or direct line between the fluid devices 13 and 22—23. Therefore, the conduits will assume a looped or sinuous form between the devices. Opposite end portions of the conduits are sustained in position clear of the ground by means of their connection to the fluid devices. The slack intermediate portions of the conduits are supported in a position clear of the ground by means of a carrier here designated generally by the numeral 51.

The preferred form of carrier illustrated here comprises a pair of parts, one of which is a support in the form of a rod 52 which extends forwardly and upwardly from a bracket 53 rigidly carried at the forward portion of the implement frame 14. The rear or lower end of the rod 52 is bent downwardly at 54 so that its association with the bracket 53 is such as to provide a pivot on a vertical axis. The upper or forward end of the rod 52 is bent or coiled into the form of an eye 55 to provide the first of a pair of guide portions. This eye portion is located at a point or position spaced from a straight line drawn from the casing 13 to the motor 22—23. The other part of the carrier is likewise in the form of a rod 56 which has its lower or rear end formed as an eye 57 to provide the second of the pair of guide means. The rod 52 extends through the eye 57 and the rod 56 extends through the eye 55, the two rods being substantially parallel and coextensive. The rod 56, however, extends forwardly of the eye 55 and has formed thereon an eye 58 to which an S-hook 59 is connected. Extending from the S-hook is a carrier clip 60 which embraces or engages the conduits 25 intermediate the fluid devices 13 and 22—23.

In its normal position, as shown in Figures 1 and 4, the carrier extends generally in the direction of travel and sustains the intermediate portions of the conduits 25 clear of the ground and out of the way of any possible interference with the tractor, implement or hitch. In the preferred construction illustrated, the S-hook 59, clip 60 and eye 58 comprise an articulate connection substantially vertically aligned with the pivot 38 on the drawbar 29. Because of the general loose- ness in this connection, the clip 60 may pivot about a vertical axis above the pivot 38. Thus, the carrier is free to swing laterally as the tractor and implement move relatively laterally, as on turns or on the contour.

Figure 2:
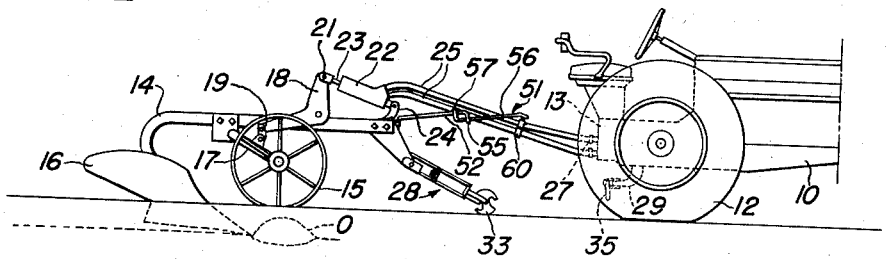

In the form of the invention of which Figures 1 and 4 are representative, the stock of which the rods 52 and 56 are formed is inherently resilient and flexible, so that the conduits 25 will be normally supported in the positions illustrated. Further, the parts comprising the rods 52 and 56 are relatively extensible, since they are, in effect, telescopically related by means of the guiding eyes 55 and 57. Hence, when the implement strikes an obstruction, as at O, which causes release of the hitch 28, as shown in Figure 2, the tractor may continue forwardly without the implement, thus taking the slack out of the conduits and causing downward deflection of the carrier 51. It follows, of course, that the pulling forces applied to the conduits 25 will likewise apply a pulling force to the lower rod 56 and thus will extend that rod with respect to the rod 52. At this point, it will be noted that interengagement of the eyes 55 and 57 effects a stop for limiting relative extension of the rods.

Figure 3:
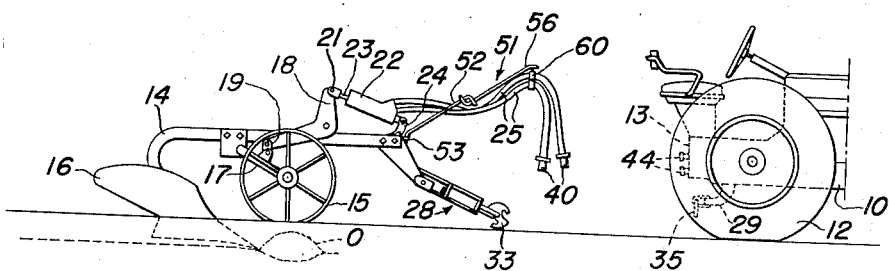

As the tractor continues forwardly with respect to the stalled implement, the conduits 25 become over-tensioned, and the frangible washers 49 shear to permit release of the nipples 40, along with the conduits 25. The inherent resiliency or flexibility of the carrier 51 will now become effective to elevate the forward portions of the conduits to positions clear of the ground, as illustrated in Figure 3. By this time, it is expected that the operator of the tractor will become aware of the abnormal condition and will stop the tractor preparatory to backing the same for reconnection to the implement, so that he may again proceed after the obstruction has been eliminated.

Since the forward portions of the conduits are no longer sustained by the casing 13 when the couplings 27 have separated, the weight carried by the forward portion of the carrier will be substantially greater than that normally carried. Hence, the frictional engagement between the telescopically related rods 52 and 56 will serve to maintain the rods in the position of Figure 3. Of course, the operator, upon reconnection of the implement and tractor, will restore the rods to their normal positions so that he may replace the shear washers and reconnect the couplings 27.

The modified form of the invention shown in Figure 7 illustrates another form of the association of resilient means with the carrier. In this instance the rod 52 is replaced by a rod 52ᵃ which may have one or more coils at its lower end, as illustrated at 52ᵇ. In either case, the functioning of the carrier will be substantially the same. Likewise, the carrier may be modified by other equivalent means to accomplish the same result.

The inclination of the parts and the telescopic arrangement thereof provide for influencing relative extension of the parts upwardly as well as forwardly, in addition to providing for deflection of the carried portion of the conduits from a point spaced in a transverse vertical plane cutting the direct line between the fluid devices. The carrier is, as aforesaid, biased for return to its upper position to sustain the uncoupled ends of the conduits clear of the ground. As stated above, the frictional interengagement of the rods when extended provides releasable means for holding the rods in extended position so as to insure the support of the conduits at an adequate level.

Other features and objects of the invention not specifically enumerated above will undoubtedly occur to those versed in the art, as will various modifications and alterations in the preferred forms of the invention illustrated and described, all of which may be achieved without departing from the spirit and scope of the invention as defined in the appended claims.

What is claimed is:

1. For use with a propelling vehicle and a trailing unit, such as an implement or another vehicle, interconnected for forward travel in unison by means including a separable hitch, wherein the propelling vehicle and trailing unit respectively have fluid devices spaced apart longitudinally when the propelling vehicle and unit are normally hitched and wherein the fluid devices are interconnected by a flexible, sinuous or looped fluid-transmitting conduit that is connected to the propelling vehicle fluid device by a coupling that is separable in response to the application of excess forces thereto, as when the hitch separates and the propelling vehicle continues ahead without the trailing unit: a conduit carrier comprising a first elongated, vertically flexible member having at one end portion thereof means for supporting the member on the trailing unit to incline upwardly and forwardly to a second end portion intermediate the fluid devices and at a level higher than a direct line between said devices; a second member carried for upward and forward sliding on the first member and normally positioned at and returnable to a rearward lower position on the first member; and means connected to the second member for engaging the conduit rearwardly of the coupling to carry a looped portion thereof.

2. The invention defined in claim 1, further characterized in that: the first member has a guide part at its upper forward end portion; the second member is elongated and generally parallels the first member and is carried by said guide part; and a guide part is provided on the second member at its lower rear end portion and is cooperative with the first member, said guide parts serving to carry the second member on the first member.

3. The invention defined in claim 1, further characterized in that: the members respectively have releasably interengageable parts normally released when the second member is in its rearward lower position and operative upon forward and upward sliding of the second member for releasably maintaining the second member in its forward and upward position.

4. For use with first and second vehicles or the like interconnected by means including a separable hitch for travel together, wherein each vehicle has a fluid-containing device and the devices are interconnected by a flexible fluid-transmitting conduit which is substantially longer than the distance between the fluid devices when the vehicles are normally hitched and which includes a coupling intermediate the fluid devices that is separable in response to the application of excess forces thereto, as when the hitch separates and one vehicle moves relative to the other so that the distance between the fluid devices becomes greater than the length of the conduit: a conduit carrier, comprising a first part having means for support on the first vehicle and inclining upwardly and toward the second vehicle; a second part generally paralleling the first part and having means for engaging a portion of the conduit at the first-vehicle side of the coupling to carry the conduit in loop form between the fluid devices; and means slidably supporting the second part on the first part for movement of said second part relative to the first part and in a direction upwardly and toward the second vehicle when the hitch separates.

5. The invention defined in claim 4, further characterized in that: resilient means is provided in association with one of said parts to provide for downward deflection of the parts, when the vehicles separate and while the coupling remains connected, and for upward return of the parts after the coupling separates.

6. The invention defined in claim 5, further characterized in that: the resilient means is inherent in at least one of the parts.

WALTER H. SILVER.
OREY W. OERMAN.

References Cited in the file of this patent

UNITED STATES PATENTS

| Number | Name | Date |
|---|---|---|
| 515,220 | Harris et al. | Feb. 20, 1894 |
| 1,560,789 | Johnson et al. | Nov. 10, 1925 |
| 2,018,838 | Connors | Oct. 29, 1935 |
| 2,048,180 | Conners et al. | July 21, 1936 |
| 2,236,247 | Kolb | Mar. 25, 1941 |
| 2,292,961 | Mott | Aug. 11, 1942 |
| 2,319,486 | Austin | May 18, 1943 |
| 2,430,696 | Acton | Nov. 11, 1947 |
| 2,461,705 | Stranberg | Feb. 15, 1949 |
| 2,513,651 | Kirksey | July 4, 1950 |